United States Patent
Putzig

(10) Patent No.: US 7,795,190 B2
(45) Date of Patent: *Sep. 14, 2010

(54) PROCESS TO PREPARE BOROZIRCONATE SOLUTION AND USE AS A CROSS-LINKER IN HYDRAULIC FRACTURING FLUIDS

(75) Inventor: Donald Edward Putzig, Newark, DE (US)

(73) Assignee: E.I. du Pont de Nemours and Company

( * ) Notice: Subject to any disclaimer, the term of this patent is extended or adjusted under 35 U.S.C. 154(b) by 175 days.

This patent is subject to a terminal disclaimer.

(21) Appl. No.: 12/002,184

(22) Filed: Dec. 14, 2007

(65) Prior Publication Data

US 2009/0151945 A1 Jun. 18, 2009

(51) Int. Cl.
C01G 25/00 (2006.01)
C09K 8/68 (2006.01)

(52) U.S. Cl. .................. 507/273; 423/69; 423/275; 507/214; 507/215; 507/216; 507/271

(58) Field of Classification Search .................. 507/273, 507/214, 215, 216, 271; 423/69, 275
See application file for complete search history.

(56) References Cited

U.S. PATENT DOCUMENTS

| | | | |
|---|---|---|---|
| 4,514,309 A | 4/1985 | Wadhwa | |
| 4,686,052 A | 8/1987 | Baranet et al. | |
| 5,165,479 A | 11/1992 | Harris et al. | |
| 5,217,632 A | 6/1993 | Sharif | |
| 5,271,466 A | 12/1993 | Harms | |
| 5,558,161 A | 9/1996 | Vitthal et al. | |
| 5,806,597 A | 9/1998 | Tjon-Joe-Pin et al. | |
| 5,827,804 A | 10/1998 | Harris et al. | |
| 5,950,731 A | 9/1999 | Shuchart et al. | |
| 6,186,235 B1 | 2/2001 | Tjon-Joe-Pin et al. | |
| 6,214,773 B1 | 4/2001 | Harris et al. | |
| 6,454,008 B1 | 9/2002 | Chatterji et al. | |
| 6,488,091 B1 | 12/2002 | Weaver et al. | |
| 6,613,720 B1 | 9/2003 | Feraud et al. | |
| 6,734,146 B2 | 5/2004 | Chatterji et al. | |
| 6,793,018 B2 | 9/2004 | Dawson et al. | |
| 6,810,959 B1 | 11/2004 | Qu et al. | |
| 6,814,145 B2 | 11/2004 | Maberry et al. | |
| 6,818,598 B2 | 11/2004 | Maberry et al. | |
| 6,918,445 B2 | 7/2005 | Todd et al. | |
| 6,971,448 B2 | 12/2005 | Slabaugh et al. | |
| 6,983,801 B2 | 1/2006 | Dawson et al. | |
| 7,001,872 B2 | 2/2006 | Pyecroft et al. | |
| 7,036,590 B2 | 5/2006 | Harris | |
| 2003/0092584 A1 | 5/2003 | Crews | |
| 2003/0114539 A1 | 6/2003 | Weaver et al. | |
| 2004/0238169 A1 | 12/2004 | Todd et al. | |
| 2005/0065038 A1 | 3/2005 | Weaver et al. | |
| 2005/0065040 A1 | 3/2005 | Weaver et al. | |
| 2005/0137094 A1 | 6/2005 | Weaver et al. | |
| 2005/0178553 A1 | 8/2005 | Harris | |
| 2005/0269099 A1 | 12/2005 | Stegent et al. | |
| 2005/0284637 A1 | 12/2005 | Stegent et al. | |
| 2006/0009363 A1 | 1/2006 | Crews | |
| 2006/0030493 A1 | 2/2006 | Segura | |
| 2006/0032636 A1 | 2/2006 | Lord et al. | |
| 2007/0187101 A1 | 8/2007 | Putzig | |
| 2009/0149355 A1* | 6/2009 | Putzig | 507/240 |
| 2009/0151946 A1* | 6/2009 | Putzig | 166/280.2 |

FOREIGN PATENT DOCUMENTS

| | | |
|---|---|---|
| GB | 2 108 122 A | 5/1983 |
| JP | 2005126672 | 5/2005 |

OTHER PUBLICATIONS

Kyker et al., Reactions of Titanium Tetrachloride with $BCI_3$, $(CH_3)_2NBCI_2$, $[(CH_3)_2N]_2BCI$, $[(CH_3)_2N]_3B$, $[CH_3)_2N]_2BCH_3$, and $B_2[N(CH_3)_2]_4^{1a}$; Journal of the American Chemical Society (1968), 90(14), 3676-3677.

(Continued)

Primary Examiner—Timothy J. Kugel
(74) Attorney, Agent, or Firm—Kathryn M. Sanchez

(57) ABSTRACT

A process to prepare a stable solution of a borozirconate complex is disclosed and use of the solution in oil field applications such as hydraulic fracturing and plugging of permeable zones. The process comprises contacting zirconium complex with alkanolamine, then water and optionally and preferably a hydroxyalkylene diamine, then with a boron compound. The solution is particularly suitable for use in a cross-linking composition in hydraulic fracturing and plugging of permeable zones of subterranean formations at temperatures of 275° F. (135° C.) and higher in the formation.

23 Claims, No Drawings

OTHER PUBLICATIONS

Dey et al., Metallic complexes as ligands: Part II—Nickel(II) complex of the Schiff base derived from 3-formylsalicylic acid and ethylenediamine as ligand for titanium, zirconium, tin, phosphorus, and boron; Indian Journal of chemistry, Section A: Inorganic, Physical, Theoretical & Analytical (1981), 20A(3), 848-851. Abstract.

Reger et al., Poly(pyrazolyl)borate Complexes of Zirconium(IV); Inorganic Chemistry (1982), 21(2), 840-842.

Tarquini, Poly(pyrazolyl)borate complexes of zirconium; Diss, Abstr. Int. B (1984), 44(9), 2749-2750; Available from Univ. Microfilms Int., Order No. DA8329680. Abstract.

Ashe et al., Conformational Properties of Boron-Bridged Dimethyethylenediamino Bis(boratabenzene) Zirconium(IV) and Iron (II) Complexes; Organomatallics (2001), 20(3), 468-473; American Chemical Society.

* cited by examiner

PROCESS TO PREPARE BOROZIRCONATE SOLUTION AND USE AS A CROSS-LINKER IN HYDRAULIC FRACTURING FLUIDS

FIELD OF THE INVENTION

The present invention relates to borozirconate compositions and their use in oil field applications such as hydraulic fracturing and plugging of permeable zones.

BACKGROUND OF THE INVENTION

The production of oil and natural gas from an underground well (subterranean formation) can be stimulated by a technique called hydraulic fracturing, in which a viscous fluid composition (fracturing fluid) containing a suspended proppant (e.g., sand, bauxite) is introduced into an oil or gas well via a conduit, such as tubing or casing, at a flow rate and a pressure which create, reopen and/or extend a fracture into the oil- or gas-containing formation. The proppant is carried into the fracture by the fluid composition and prevents closure of the formation after pressure is released. Leak-off of the fluid composition into the formation is limited by the fluid viscosity of the composition. Fluid viscosity also permits suspension of the proppant in the composition during the fracturing operation. Cross-linking agents, such as borates, titanates or zirconates, are usually incorporated into the fluid composition to control viscosity.

Typically, less than one third of available oil is extracted from a well after it has been fractured before production rates decrease to a point at which recovery becomes uneconomical. Enhanced recovery of oil from such subterranean formations frequently involves attempting to displace the remaining crude oil with a driving fluid, e.g., gas, water, brine, steam, polymer solution, foam, or micellar solution. Ideally, such techniques (commonly called flooding techniques) provide a bank of oil of substantial depth being driven into a producing well; however, in practice this is frequently not the case. Oil-bearing strata are usually heterogeneous, some parts of them being more permeable than others. As a consequence, channeling frequently occurs, so that the driving fluid flows preferentially through permeable zones depleted of oil (so-called "thief zones") rather than through those parts of the strata which contain sufficient oil to make oil-recovery operations profitable.

Difficulties in oil recovery due to thief zones may be corrected by injecting an aqueous solution of an organic polymer and a cross-linking agent into a subterranean formation under conditions where the polymer will be cross-linked to produce a gel, thus reducing permeability of the subterranean formation to the driving fluid (gas, water, etc.). Polysaccharide- or partially hydrolyzed polyacrylamide-based fluids cross-linked with certain aluminum, titanium, zirconium, and boron based compounds are used in these enhanced oil recovery applications. Cross-linked fluids or gels, whether for fracturing a subterranean formation or for reducing permeability of zones in subterranean formation, are now being used in hotter and deeper wells under a variety of temperature and pH conditions. In these operations the rate of cross-linking is critical to the successful generation of viscosity.

Boron-based compounds are typically used as cross-linkers in fracturing fluids utilized in low to mid temperature wells (150-250° F., 66-121° C.). Cross-linking takes place immediately on mixing of the boron compound with the polymer base-gel. A pH of 10 or greater is required to initiate cross-linking with boron-based cross-linkers. Because boron cross-linked gels are not shear sensitive, they can be used, even though they cross-link at or near the surface.

Existing delayed zirconium-based cross-linkers, based on triethanolamine or hydroxyalkylated ethylenediamine have been designed to initiate cross-linking in the wellbore. Therefore, they are ineffective at generating viscosity under mild surface temperature conditions. The gels are also shear sensitive and require higher horsepower (energy consumption) to pump.

The need exists in some fracturing fluid applications to generate an initial viscosity at the surface, followed by a delayed viscosity generation, once the fluid is subjected to higher down-hole temperatures. In the case of mid-high temperature wells (250-300° F., 121-149° C.), a 5-10 minute delay in cross-linking is preferred. For deeper, higher temperature wells (300-400° F., 149-204° C.), it may be necessary to have cross-link times up to 10 minutes.

Current technology involves using a borate-ion-generating-material in combination with a delayed zirconate cross-linker to accomplish both surface and delayed viscosity development. However, borate/zirconate cross-linking compositions suffer from disadvantages, such as poor shelf stability, insufficient viscosity generation and undesirable cross-linking rates.

U.S. Pat. No. 4,686,052 discloses a cross-linker comprising an organic zirconate stabilized with triethanolamine, optionally to which borax may be added. The cross-linker mixture with borax has extremely long cross-linking time and low viscosity development.

There is a need for a borozirconate cross-linker which is stable on extended storage, is capable of generating excellent viscosity in the desired 5-10 minute range for use in the higher temperature wells (300-400° F., 149-204° C.), and which can be used in place of existing delayed zirconate cross-linkers in areas where an initial surface viscosity development is required, or in place of delayed borate cross-linkers, which generally have limited temperature application. The present invention meets these needs.

There is a need for a borozirconate cross-linker which is stable on extended storage, is capable of generating excellent viscosity in the desired 5-10 minute range for use in the higher temperature wells, and which can be used in place of existing delayed zirconate cross-linkers in areas where an initial surface viscosity development is required, or in place of delayed borate cross-linkers, which generally have limited temperature application. The present invention meets these needs.

SUMMARY OF THE INVENTION

The present invention provides a process for preparing a solution of a borozirconate complex suitable for cross-linking in a fracturing fluid which comprises: (a) contacting a zirconium complex with an alkanolamine at a ratio of 2 to 10 moles of the alkanolamine per mole of zirconium to form a first mixture; (b) contacting the first mixture with water at a ratio of about 2 to 10 moles of water per mole of zirconium and with 0 to 2 moles of a hydroxyalkylene diamine per mole of zirconium to form a second mixture; (c) contacting the second mixture with 1 to 4 moles of a boron compound per mole of zirconium in an alcohol at a temperature of 25° C. to 90° C. for a period of time sufficient to stabilize the resulting borozirconate solution. Preferably the amount of hydroxyalkylene diamine in step (b) is from 0.1 to 2 moles of the hydroxyalkylene diamine per mole of zirconium, more preferably 0.5 to 1 mole of the hydroxyalkylene diamine per mole of zirconium.

There is further provided a process for preparing a solution of a borozirconate complex suitable for cross-linking in a fracturing fluid which consists of: (a) contacting a zirconium complex with an alkanolamine at a ratio of 2 to 10 moles of the alkanolamine per mole of zirconium to form a first mixture; (b) contacting the first mixture with water at a ratio of about 2 to 10 moles of water per mole of zirconium to form a second mixture; (c) contacting the second mixture with 1 to 4 moles of a boron compound per mole of zirconium in an alcohol at a temperature of 25° C. to 90° C. for a period of time sufficient to stabilize the resulting borozirconate solution.

The present invention further provides a cross-linking composition comprising the solution of the borozirconate complex prepared according to the process of this invention and to methods for using the cross-linking composition as a fracturing fluid.

DETAILED DESCRIPTION OF THE INVENTION

Trademarks and tradenames are shown herein in upper case.

This invention provides a solution of a borozirconate complex suitable for use in a fracturing fluid. The borozirconate complex may be in the form of a single complex or be in the form of multiple complexes in solution. The borozirconate complex is stable upon storage and is capable of generating excellent viscosity in the desired 5-10 minute range for use in higher temperature wells. By "stable" it is meant a solution comprising borozirconate complex prepared according to the process of this invention can be stored at ambient temperature for at least six months without precipitation. The solution of borozirconate complex can be advantageously used in place of existing delayed zirconate cross-linkers in areas where an initial surface viscosity development is required, or in place of delayed borate cross-linkers, which generally have limited temperature application.

The solution of borozirconate complex is provided by a process comprising: (a) contacting a zirconium complex with an alkanolamine at a ratio of 2 to 10 moles of the alkanolamine per mole of zirconium to form a first mixture; (b) contacting the first mixture with water at a ratio of about 2 to 10 moles of water per mole of zirconium and with 0 to 2 moles of a hydroxyalkylene diamine per mole of zirconium to form a second mixture; (c) contacting the second mixture with 1 to 4 moles of a boron compound per mole of zirconium in an alcohol at a temperature of 25° C. to 90° C. for a period of time sufficient to stabilize the resulting borozirconate solution. Preferably the hydroxyalkylene diamine added in step (b) is at a ratio of 0.1 to 2 moles of hydroxyalkylene diamine per mole of zirconium, more preferably a mole ratio of 0.5 to 1 moles of hydroxyalkylene diamine per mole of zirconium.

There is further provided a process for preparing a solution of a borozirconate complex suitable for cross-linking in a fracturing fluid which consists of: (a) contacting a zirconium complex with an alkanolamine at a ratio of 2 to 10 moles of the alkanolamine per mole of zirconium to form a first mixture; (b) contacting the first mixture with water at a ratio of about 2 to 10 moles of water per mole of zirconium to form a second mixture; (c) contacting the second mixture with 1 to 4 moles of a boron compound per mole of zirconium in an alcohol at a temperature of 25° C. to 90° C. for a period of time sufficient to stabilize the resulting borozirconate solution.

The first mixture in step (a), an alcoholic solution of a zirconium complex with an alkanolamine, can be prepared by a process which comprises contacting a solution of a tetraalkyl zirconate in a $C_1$-$C_6$ alcohol with from 2 to 10 moles of an alkanolamine per mole of zirconium.

A number of tetraalkyl zirconates (also known as zirconium tetraalkoxides) can be used to prepare the above zirconium complex, e.g., tetra-isopropyl zirconate, tetra-n-propyl zirconate, and tetra-n-butyl zirconate. The preferred tetraalkyl zirconate is tetra-n-propyl zirconate, available as TYZOR NPZ organic zirconate, a solution in n-propanol, with a zirconium content as $ZrO_2$ of about 28% by weight, and available from E.I. du Pont de Nemours and Company, Wilmington, Del.

Examples of suitable alkanolamines include, but are not limited to, triethanolamine, tri-n-propanolamine, tri-iso-propanolamine, diisopropanolamine, and mixtures thereof. Preferably the alkanolamine is triethanolamine.

Contacting the above tetraalkyl zirconates with the alkanolamine can be carried out at a variety of temperatures, e.g., between 25° C. and 90° C., preferably between 50° C. and 80° C., and in any order. The first mixture is then held at this temperature for a sufficient period to reach equilibrium. A contact time of about 2 hours at 60° C. is adequate, but other periods and temperatures may also be used.

In step (b), the first mixture is contacted with water at a ratio of about 2 to 10 moles of water per mole of zirconium. A hydroxyalkylene diamine is added with the water at a ratio of 0 to 2 moles per mole of zirconium. Preferably, the ratio is 0.1 to 2 moles of hydroxyalkylene diamine per mole of zirconium, more preferably 0.5 to 1 mole of hydroxyalkylene diamine per mole of zirconium. The hydroxyalkylene diamine acts as a complexing ligand to delay the rate of cross-linking. Preferably the hydroxyalkylene diamine is N,N,N',N'-tetrakis-(2-hydroxyisopropyl)ethylene diamine, or simply, tetra-hydroxyisopropylethylenediamine, available commercially, for example, from BASF Corporation, Mount Olive, N.J., under the name QUADROL polyol. The second mixture is then held at a temperature between 25° C. and 90° C. for a period of time sufficient to reach equilibrium. A contact time of about 2 hours at 60° C. is adequate, but other periods and temperatures may also be used.

In step (c), the second mixture from step (b) is contacted with a boron compound and alcohol at a ratio of 1 to 4 moles of a boron compound per mole of zirconium in an alcohol are added at a temperature of 25° C. to 90° C. for a period of time sufficient to stabilize the resulting solution. A contact time of about 2 hours at 60° C. is adequate, but other periods and temperatures may also be used.

The boron compound may be selected from the group consisting of boric acid and trialkyl borates. Preferably the boron compound is boric acid.

The process of this invention is performed in an alcohol solvent. The solvent is typically an alcohol having 1 to 6 carbon atoms. Typically the solvent is methanol, isopropanol, or n-propanol. Preferably the alcohol is methanol.

The present invention also provides a cross-linking composition which comprises an aqueous liquid; a pH buffer; a cross-linkable organic polymer; and a solution of a borozirconate made by a process comprising (a) contacting a zirconium complex with an alkanolamine at a ratio of 2 to 10 moles of the alkanolamine per mole of zirconium to form a first mixture; (b) contacting the first mixture with water at a ratio of about 2 to 10 moles of water per mole of zirconium and with 0 to 2 moles of a hydroxyalkylene diamine per mole of zirconium to form a second mixture; (c) contacting the second mixture with 1 to 4 moles of a boron compound per mole of zirconium in an alcohol at a temperature of 25° C. to 90° C. for a period of time sufficient to stabilize the resulting borozirconate solution. Preferably the amount of hydroxyalkylene diamine in step (b) is from 0.1 to 2 moles of the hydroxyalkylene diamine per mole of zirconium, more preferably 0.5 to 1 mole of the hydroxyalkylene diamine per mole of zirconium.

The aqueous liquid is typically selected from the group consisting of water, aqueous alcohol, and aqueous solution of a clay stabilizer. The alcohol can be the same or different alcohol as the reaction solvent, that is, an alcohol having 1 to 6 carbon atoms. Preferably, when the aqueous liquid is aqueous alcohol, the alcohol is methanol or ethanol. Clay stabilizers include, for example, hydrochloric acid and chloride salts, such as, tetramethylammonium chloride (TMAC) or potassium chloride. Aqueous solutions comprising clay stabilizers may comprise, for example, 0.05 to 0.5 weight % of the stabilizer, based on the combined weight of the aqueous liquid and the organic polymer (i.e., the base gel). Preferably, when the aqueous liquid is an aqueous solution of a clay stabilizer, the clay stabilizer is tetramethylammonium chloride or potassium chloride.

The aqueous liquid can also be a mixture of water and one or more organic solvents. Organic solvents that may be used include alcohols, glycols, polyols, and hydrocarbons such as diesel.

Preferably, the aqueous liquid is water, aqueous methanol, aqueous ethanol, an aqueous solution of potassium chloride, an aqueous solution of tetramethylammonium chloride, or a combination of two or more thereof.

The cross-linking composition comprises an effective amount of a pH buffer (b) to control pH. The pH buffer may be acidic, neutral or basic. The pH buffer is generally capable of controlling the pH from about pH 5 to about pH 12. For example in a composition for use at a pH of 5-7, a fumaric acid-based buffer or a sodium diacetate-based buffer can be used. In a composition for use at a pH of 7-8.5, a sodium bicarbonate-based buffer can be used. In a composition for use at a pH of 9-12, a sodium carbonate or sodium hydroxide-based buffer can be used. Other suitable pH buffers can be used, as are known to those skilled in the art.

The composition further comprises a cross-linkable organic polymer. Suitable cross-linkable organic polymers are selected from the group consisting of solvatable polysaccharides, polyacrylamides and polymethacrylamides. Preferably the organic polymer is a solvatable polysaccharide and is selected from the group consisting of gums, gum derivatives and cellulose derivatives. Gums include guar gum and locust bean gum, as well as other galactomannan and glucomannan gums, such as those derived from sennas, Brazilwood, tera, honey locust, karaya gum and the like. Preferred gum derivatives include hydroxyethyl guar (HEG), hydroxypropyl guar (HPG), carboxyethylhydroxyethyl guar (CEHEG), carboxymethylhydroxypropyl guar (CMHPG), and carboxymethyl guar (CMG). Preferred cellulose derivatives include those containing carboxyl groups, such as carboxymethylcellulose (CMC) and carboxymethylhydroxyethylcellulose (CMHEC). The solvatable polysaccharides can be used individually or in combination; usually, however, a single material is used. Guar derivatives and cellulose derivatives are preferred, such as, HPG, CMC and CMHPG. HPG is generally more preferred based upon its commercial availability and desirable properties. However, CMC and CMHPG may be more preferred in cross-linking compositions when the pH of the composition is less than 6.0 or higher than 9.0, or when the permeability of the formation is such that one wishes to keep the residual solids at a low level to prevent damage to the formation. The cross-linkable polymer is normally mixed with the aqueous liquid to form a base gel.

The solution of borozirconate complex is prepared as described previously, and may contain an added solvent or solvents.

The cross-linking composition may comprise optional components, including those which are common additives for oil field applications. Thus, the composition may further comprise one or more of proppants, friction reducers, bactericides, hydrocarbons, chemical breakers, polymer stabilizers, surfactants, formation control agents, and the like. Proppants include sand, bauxite, glass beads, nylon pellets, aluminum pellets and similar materials. Friction reducers include polyacrylamides. Hydrocarbons include diesel oil. Chemical breakers break the cross-linked polymer (gel) in a controlled manner and include enzymes, alkali metal persulfate, and ammonium persulfate. Polymer stabilizers include methanol, alkali metal thiosulfate, and ammonium thiosulfate.

These optional components are added in an effective amount sufficient to achieve the desired cross-linking performance based on the individual components, desired cross-linking time, temperature and other conditions present in the formation being fractured or permeable zone being plugged.

The cross-linking composition is produced by mixing the solution of the borozirconate complex with the other components, in any order. For example, in one particular application in an oil field, the solution of borozirconate complex and optional components are introduced into a subterranean formation, while the cross-linkable organic polymer and aqueous liquid are introduced into the formation as a separate stream. The pH buffer is independently admixed with the zirconium solution, the organic polymer and/or the aqueous liquid. Alternatively, all components may be premixed and introduced into a subterranean formation as a single stream. Advantageously, the components may be mixed in different combinations, and more advantageously, the components may be mixed just prior to use to enable easy variation and adjustment of the cross-linking rate.

This invention provides a method for hydraulically fracturing a subterranean formation, which comprises introducing into the formation at a flow rate and pressure sufficient to create, reopen, and/or extend one or more fractures in the formation, a cross-linking composition comprising an aqueous liquid; a pH buffer; a cross-linkable organic polymer, and a solution of a borozirconate complex described previously, and made by a process comprising (a) contacting a zirconium complex with an alkanolamine at a ratio of 2 to 10 moles of the alkanolamine per mole of zirconium to form a first mixture; (b) contacting the first mixture with water at a ratio of about 2 to 10 moles of water per mole of zirconium and with 0 to 2 moles of a hydroxyalkylene diamine per mole of zirconium to form a second mixture; (c) contacting the second mixture with 1 to 4 moles of a boron compound per mole of zirconium in an alcohol at a temperature of 25° C. to 90° C. for a period of time sufficient to stabilize the resulting borozirconate solution. Preferably the amount of hydroxyalkylene diamine in step (b) is from 0.1 to 2 moles of the hydroxyalkylene diamine per mole of zirconium, more preferably 0.5 to 1 mole of the hydroxyalkylene diamine per mole of zirconium.

In one embodiment of the method for hydraulically fracturing a subterranean formation, the solution of borozirconate complex and the cross-linkable polymer are contacted prior to their introduction into the formation, such that the cross-linking agent and polymer react to form a cross-linked gel. The gel is then introduced into the formation at a flow rate and pressure sufficient to create, reopen, and/or extend a fracture in the formation.

In this method, a base gel is prepared by mixing a cross-linkable organic polymer with an aqueous liquid. Then the cross-linked gel composition is prepared by mixing the base gel with a solution of a borozirconate complex described previously, and made by a process comprising (a) contacting a zirconium complex with an alkanolamine at a ratio of 2 to 10 moles of the alkanolamine per mole of zirconium to form a first mixture; (b) contacting the first mixture with water at a ratio of about 2 to 10 moles of water per mole of zirconium and with 0 to 2 moles of a hydroxyalkylene diamine per mole of zirconium to form a second mixture; (c) contacting the second mixture with 1 to 4 moles of a boron compound per mole of zirconium in an alcohol at a temperature of 25° C. to 90° C. for a period of time sufficient to stabilize the resulting borozirconate solution. Preferably the amount of hydroxyalkylene diamine in step (b) is from 0.1 to 2 moles of the hydroxyalkylene diamine per mole of zirconium, more preferably 0.5 to 1 mole of the hydroxyalkylene diamine per mole of zirconium. The solution of borozirconate complex, the base gel, or both further comprise a pH buffer.

Alternatively, the subterranean formation may be penetrated by a wellbore, such that contacting the solution of borozirconate complex with the base gel occurs in the wellbore and the cross-linked gel is introduced into the formation from the wellbore. This method of hydraulically fracturing a subterranean formation penetrated by a wellbore comprises (a) preparing a base gel by mixing a cross-linkable organic polymer with an aqueous liquid; (b) introducing the base gel into the wellbore; (c) simultaneously with or sequentially after introducing the base gel into the wellbore, introducing the solution of borozirconate complex described previously, and made by a process comprising (1) contacting a zirconium complex with an alkanolamine at a ratio of 2 to 10 moles of the alkanolamine per mole of zirconium to form a first mixture; (2) contacting the first mixture with water at a ratio of about 2 to 10 moles of water per mole of zirconium and with 0 to 2 moles of a hydroxyalkylene diamine per mole of zirconium to form a second mixture; (3) contacting the second mixture with 1 to 4 moles of a boron compound per mole of zirconium in an alcohol at a temperature of 25° C. to 90° C. for a period of time sufficient to stabilize the resulting borozirconate solution; (d) permitting the base gel and the solution of borozirconate complex to react to form a cross-linked aqueous gel; and (e) introducing the cross-linked gel into the formation from the wellbore at a flow rate and pressure sufficient to create, reopen, and/or extend a fracture in the formation. Preferably the amount of hydroxyalkylene diamine in step (b) is from 0.1 to 2 moles of the hydroxyalkylene diamine per mole of zirconium, more preferably 0.5 to 1 mole of the hydroxyalkylene diamine per mole of zirconium. A pH buffer is independently admixed with the base gel, the solution of zirconium complex or both prior to introducing the base gel and the borozirconate solution into the wellbore.

Upon creation of a fracture or fractures, the method may further comprise introducing a cross-linking composition comprising the solution of borozirconate complex, a cross-linkable organic polymer and proppant into the fracture or fractures. This second introduction of a solution of borozirconate complex is preferably performed in the event the cross-linking composition used to create the fracture or fractures did not comprise proppant.

Another use for the solution of borozirconate complex of the present invention relates to a method for selectively plugging permeable zones and leaks in subterranean formations which comprises introducing into the permeable zone or the site of the subterranean leak, a cross-linking composition comprising (a) an aqueous liquid; (b) a pH buffer, (c) a cross-linkable organic polymer; and (d) an aqueous solution of the borozirconate complex described previously. The pH buffer may be admixed with the solution of borozirconate complex prior to introducing the cross-linking composition into the permeable zone or site of the leak.

In a first embodiment of the method for plugging a permeable zone or a leak in a subterranean formation, the aqueous liquid, pH buffer, cross-linkable organic polymer and the solution of borozirconate complex are contacted prior to their introduction into the subterranean formation, such that the polymer and borozirconate complex react to form a cross-linked aqueous gel, which gel is then introduced into the formation.

In an alternative embodiment of the method for plugging a permeable zone or a leak in a subterranean formation, the solution of borozirconate complex and the cross-linkable organic polymer are introduced separately, either simultaneously or sequentially, into the permeable zone or the site of the subterranean leak such that cross-linking occurs within the subterranean formation. This method comprises (a) preparing a base gel by mixing a cross-linkable organic polymer with an aqueous liquid; (b) introducing the base gel into the into the permeable zone or the site of the subterranean leak, (d) simultaneously with or sequentially after introducing the base gel into the into the permeable zone or the site of the subterranean leak, introducing the solution of borozirconate complex into the permeable zone or the site of the subterranean leak; (e) permitting the base gel and the cross-linking agent to react to form a cross-linked aqueous gel to plug the zone and/or leak. The solution of borozirconate complex, the base gel, or both further comprise a pH buffer.

The relative amounts of cross-linkable organic polymer and the borozirconate complex may vary. One uses small but effective amounts which for both will vary with the conditions, e.g., the type of subterranean formation, the depth at which the method (e.g., fluid fracturing, permeable zone plugging or leak plugging) is to be performed, temperature, pH, etc. Generally one uses as small an amount of each component as will provide the viscosity level necessary to effect the desired result, i.e., fracturing of the subterranean formation, or plugging permeable zones or leaks to the extent necessary to promote adequate recovery of oil or gas from the formation.

For example, satisfactory gels can generally be made for fluid fracturing by using the cross-linkable organic polymer in amounts up to about 1.2 weight % and the cross-linking composition in amounts up to about 0.50 weight % of the borozirconate complex, with percentages being based on the total weight of the cross-linking composition. Preferably, from about 0.25 to about 0.75 weight % of the cross-linkable organic polymer is used and from about 0.05 to about 0.25 weight % of the borozirconate complex is used.

In a method for plugging permeable zones or leaks, generally about 0.25 to 1.2 weight % of a cross-linkable organic polymer is used, preferably 0.40 to 0.75 weight %, based on the total weight of the cross-linking composition. Generally about 0.01 to 0.50 weight % of the borozirconate complex is used, preferably 0.05 to 0.25 weight %, based on the total weight of the cross-linking composition.

The amount of borozirconate complex used to cross-link the organic polymer is that which provides a zirconium ion concentration in a range from about 0.0005 weight % to about 0.1 weight %, based on the total weight of the cross-linking composition. The preferred concentration of zirconium ion is in the range of from about 0.001-0.05 weight %, based on the total weight of the cross-linking composition.

Typically the solution of borozirconate complex of this invention can be used at a pH of from about 8 to 11. Advantageously, the solution of borozirconate complex of this invention is used at a temperature of 275-325° F. (135-163° C.). For successful completion of the fracturing operation, whether hydraulic fracturing or plugging a permeable zone, the cross-linking composition should provide a viscosity of at least 200 Cp, preferably at least 300 Cp, 90 minutes after introducing the cross-linking composition into the subterranean formation or permeable zone or site of a subterranean leak.

EXAMPLES

The preparation of the compositions in the Comparative Examples and in the Examples were each carried out in closed vessels containing an agitator, thermometer, condenser, nitrogen inlet and dropping funnel. Unless specified otherwise, percentages are given by weight. Temperatures are given in degrees Celsius. The cross-linking properties of the Comparative Example and Example compositions are provided as a function of the viscosity of carboxymethylhydroxypropyl guar cross-linked with the compositions of the Comparative Example and Example.

Preparation of Base Gel

A Waring blender jar was filled with 1 liter of distilled water. To this was added 2 g of a 50% aqueous solution of tetramethylammonium chloride clay stabilizer. Agitation was started and 3.6 g of carboxymethylhydroxypropyl guar (CM-HPG) was sprinkled into the vortex of the agitating solution. The pH of the resultant slurry was adjusted to 6 with sodium diacetate and agitation continued for 30 minutes. The pH was then adjusted to 10.3 with 10% sodium hydroxide solution. Agitation was stopped and the gel was allowed to stand for 30 minutes or more before use.

Viscosity Measurement of Zirconate Cross-Linked Base Gel

To 250 ml of a vigorously agitated sample of base gel in a Waring blender jar, was added 0.00032 moles of zirconium (0.2-1.0 ml dependent on percent zirconium of cross-linker solution—hereinafter referred to as the Standard Loading Density), for each Comparative Example A-C and Example 1-7. Agitation was continued for about 15-180 seconds. A 25 ml sample of the cross-linker containing gel was placed in the cup of the FANN 50 Viscometer with an R-1, B-3 configuration and viscosity was measured at 275° F. (135° C.) and 122 rpm at 100 reciprocal seconds of shear.

The following Comparative Examples are based on the range of component molar ratios disclosed in U.S. Pat. Nos. 4,686,052 and 4,514,309 and British Patent No. GB 2,108, 122. For comparison purposes, testing conditions used to determine cross-linking efficiency were the same as used in the test conditions for the solutions borozirconate complex prepared according to the process of this invention. The test conditions differ slightly from those used in the aforementioned U.S. Patents, particularly in that carboxymethylhydroxypropylguar (CMHPG) was used in these tests rather than hydroxypropylguar as previously used. CMHPG is the preferred polymer for use by service companies with zirconate-based cross-linkers for high pH, high temperature applications. Results are provided in Table 1.

Comparative Example A

A 500-ml flask was charged with 10.4 g of tetra-n-propylzirconate (TYZOR NPZ organic zirconate) and 32.2 g of n-propanol. Agitation was started and 11.2 g of triethanolamine were added. The mixture was heated to 60° C. and held at this temperature for 2 hours. Then, a mixture of 21.4 g water and 136.4 g triethanolamine was added. When addition was complete, another 97.8 g of water were added followed by 3.5 g of sodium tetraborate. The mixture was heated another hour at 60° C. and then cooled to room temperature to give 313 g of a pale yellow liquid containing 0.67% Zr and 0.6% B.

Comparative Example B

A 500-ml flask was charged with 10.4 g of tetra-n-propylzirconate (TYZOR NPZ organic zirconate) and 24.1 g of n-propanol. Agitation was started and 22.4 g of triethanolamine were added. The mixture was heated to 60° C. and held at this temperature for 2 hours. Then, a mixture of 21.4 g of water and 136.4 g of triethanolamine was added. When addition was complete, another 97.8 g of water were added followed by 3.5 g of sodium tetraborate. The mixture was heated another hour at 60° C. and then cooled to room temperature to give 316 g of a pale yellow liquid containing 0.67% Zr and 0.6% B.

Comparative Example C

A 500-ml flask was charged with 48.2 g of sodium zirconium lactate (TYZOR 217 organic zirconate) and 20 g of tetra-triethanolamine zirconate (TYZOR TEAZ organic zirconate). Agitation was started and 22.4 g of triethanolamine were added. The mixture was heated to 60° C. and held at this temperature for 2 hours. Then, a mixture of 5 g of boric acid and 66.7 g of methanol was added. The mixture was heated another hour at 60° C. and then cooled to room temperature to give 140 g of a pale yellow liquid containing 1.9% Zr and 0.63% B.

Comparative Examples A-C were tested under typical conditions used in the oil field for fracturing high temperature wells.

Test results for Comparative Examples are provided in Table 1 below. The abbreviations and headings used in Tables 1 and 2 are as follows. The % Zr is the percent of zirconium in the cross-linker solution prepared in the Examples; Zr, ml refers to the milliliters of cross-linking solution injected in the test. NPZ refers to TYZOR NPZ organic zirconate; 217 refers to TYZOR 217 organic zirconate; TEAZ refers to TYZOR TEAZ organic zirconate; TEA is triethanolamine; Polyol is hydroxyisopropylethylenediamine, QUADROL polyol; B.A. is boric acid. "Fann Time Max, min." means the time, in minutes, it takes to reach maximum viscosity. The viscosity at this maximum time is labeled "Cp @ Max.", to indicate viscosity in centipoise (Cp). The viscosity after 90 minutes at the test temperature is labeled "Cp @ 90 min." In Tables 1 and 2, the abbreviations and headings indicate the following. NPZ refers to TYZOR NPZ organic zirconate; 217 is sodium zirconium lactate and refers to TYZOR 217 organic zirconate; TEAZ is triethanolamine zirconate and refers to TYZOR TEAZ organic zirconate; TEA is triethanolamine; B.A. is boric acid. Fann Time Max means the time in minutes it takes to reach maximum viscosity. The viscosity at this maximum time is labeled Cp@Max.Time, and the viscosity after 90 minutes at 275° F. is labeled Cp @ 90 Min.Time. The two columns for TEA are in reference to the 2 different addition points described in the Comparative Examples A and B. The second TEA addition was added to stabilize the solution so it would not lose cross-linking strength over time. The mole ratio values refer to molar ratio of components per mole of zirconium. Note that the mole ratio for (total) zirconium is 1.

TABLE 1

Performance of Comparative Examples

| Comp. Example | % Zr | NPZ, mole ratio | 217, mole ratio | TEAZ, mole ratio | First TEA, mole ratio | Second TEA, mole ratio | B.A., mole ratio | Fann Time Max, min. | Cp @ Max. | Cp @ 90 min. |
|---|---|---|---|---|---|---|---|---|---|---|
| A | 0.70 | 1 |  |  | 3 | 39 | 1.6 | 24 | 314 | 228 |
| B | 0.70 | 1 |  |  | 6 | 39 | 1.6 | 14 | 356 | 190 |
| C | 1.90 |  | 0.5 | 0.5 |  |  | 1.4 | 6 | 536 | 150 |

The data clearly shows that Comparative Examples A and B cross-link much too slowly to be of practical use under field conditions typically encountered. Comparative Example C cross-links in the desired 3-10 minute range; however, viscosity retention is undesirably low, including in comparison to the cross-linking rates achieved by the solutions prepared according to this invention (see Table 2).

The following Examples show the inventive process to prepareborozirconate solutions and results of use of the solutions as cross-linkers.

Example 1

A 500-ml flask was charged with 167 g of tetra-triethanolamine zirconate (TYZOR TEAZ organic zirconate). Agitation was started and the reaction heated to 60° C. Then, 33 g of water were added. The mixture was held for 2 hours at this temperature and then a mixture of 30 g of boric acid and 137.4 g of methanol was added. The mixture was heated another hour at 60° C. and then cooled to room temperature to give 367 g of a pale yellow liquid containing 6% Zr and 1.45% B.

Example 2

A 500-ml flask was charged with 167 g of tetra-triethanolamine zirconate (TYZOR TEAZ organic zirconate). Agitation was started and the reaction heated to 60° C. Then 33 g of water were added. The mixture was held for 2 hours at this temperature and then a mixture of 45 g of boric acid and 122.4 g of methanol was added. The mixture was heated another hour at 60° C. and then cooled to room temperature to give 367 g of a pale yellow liquid containing 6% Zr and 1.45% B.

Example 3

A 500-ml flask was charged with 60 g of tetra-n-propylzirconate (TYZOR NPZ organic zirconate). Agitation was started and 81.2 g of triethanolamine were added. The mixture was heated to 60° C. and held at this temperature for 2 hours. Then a mixture of 6.3 g of water and 39.8 g tetra-hydroxyisopropylethylenediamine (QUADROL polyol) was added and the mixture was held at 60° C. for an additional 2 hours. Then, a slurry of 8.4 g of boric acid in 84 g of methanol was added. The mixture was heated another 2 hours at 60° C. and then cooled to room temperature to give 280 g of a pale yellow liquid containing 4.4% Zr and 0.54% B.

Example 4

A 500-ml flask was charged with 60 g of tetra-n-propylzirconate (TYZOR NPZ organic zirconate). Agitation was started and 40.6 g of triethanolamine were added. The mixture was heated to 60° C. and held at this temperature for 2 hours. Then a mixture of 6.3 g of water and 39.8 g tetra-hydroxyisopropylethylenediamine (QUADROL polyol) was added and the mixture was held at 60° C. for an additional 2 hours. Then, a slurry of 16.8 g of boric acid in 75.6 g of methanol was added. The mixture was heated another 2 hours at 60° C. and then cooled to room temperature to give 238 g of a pale yellow liquid containing 5.2% Zr and 1.25% B.

Example 5

A 500-ml flask was charged with 60 g of tetra-n-propylzirconate (TYZOR NPZ organic zirconate). Agitation was started and 81.2 g of triethanolamine were added. The mixture was heated to 60° C. and held at this temperature for 2 hours. Then, a mixture of 6.3 g of water and 19.9 g tetra-hydroxyisopropylethylenediamine (QUADROL polyol) was added and the mixture was held at 60° C. for an additional 2 hours. Then, a slurry of 16.8 g of boric acid in 75.6 g of methanol was added. The mixture was heated another 2 hours at 60° C. and then cooled to room temperature to give 259 g of a pale yellow liquid containing 4.8% Zr and 1.15% B.

Example 6

A 500-ml flask was charged with 60 g of tetra-n-propylzirconate (TYZOR NPZ organic zirconate). Agitation was started and 81.2 g of triethanolamine were added. The mixture was heated to 60° C. and held at this temperature for 2 hours. Then a mixture of 6.3 g of water and 39.9 g tetra-hydroxyisopropylethylenediamine (QUADROL polyol) was added and the mixture was held at 60° C. for an additional 2 hours. Then, a slurry of 16.8 g of boric acid in 75.6 g of methanol was added. The mixture was heated another 2 hours at 60° C. and then cooled to room temperature to give 279 g of a pale yellow liquid containing 4.45% Zr and 1.07% B.

Example 7

A 500-ml flask was charged with 50 g of tetra-n-propylzirconate (TYZOR NPZ organic zirconate). Agitation was started and 145.5 g of triethanolamine were added. The mixture was heated to 60° C. and held at this temperature for 2 hours. Then, a mixture of 6.3 g of water and 19.9 g tetra-hydroxyisopropylethylenediamine (QUADROL polyol) was added and the mixture was held at 60° C. for an additional 2 hours. Then, a slurry of 14 g of boric acid in a mixture of 17.6 g water and 45.4 g of methanol was added. The mixture was heated another 2 hours at 60° C. and then cooled to room temperature to give 273 g of a pale yellow liquid containing 3.8% Zr and 0.9% B.

TABLE 2

Performance of Inventive Examples

| Example | % Zr | Zr, ml | NPZ, g (mole ratio) | TEAZ, g (mole ratio) | TEA, g (mole ratio) | QUADROL, g (mole ratio) | Water, g (mole ratio) | B.A., g (mole ratio) | Methanol, g | Fann Time Max, min. | Cp @ Max. | Cp @ 90 min. |
|---|---|---|---|---|---|---|---|---|---|---|---|---|
| 1 | 6 | 0.49 | | 167 (1) | | | 33 (7.6) | 30 (2) | 137.4 | 8 | 372 | 270 |
| 2 | 6 | 0.5 | | 167 (1) | | | 33 (7.6) | 45 (3) | 122.4 | 7 | 718 | 470 |
| 3 | 4.4 | 0.67 | 60 (1) | | 81.2 (4) | 39.8 (1) | 6.3 (2.57) | 8.4 (1) | 84 | 10 | 392 | 278 |
| 4 | 5.2 | 0.66 | 60 (1) | | 40.6 (2) | 39.8 (1) | 6.3 (2.57) | 16.8 (2) | 75.6 | 9.5 | 455 | 266 |
| 5 | 4.8 | 0.66 | 60 (1) | | 81.2 (4) | 19.9 (0.5) | 6.3 (2.57) | 16.8 (2) | 75.6 | 8 | 620 | 404 |
| 6 | 4.4 | 0.66 | 60 (1) | | 81.2 (4) | 39.8 (1) | 6.3 (2.57) | 16.8 (2) | 75.6 | 10 | 390 | 270 |
| 7 | 3.8 | | 50 (1) | | 145.5 (8.6) | 19.9 (0.5) | 17.6 (8.6) | 14 (2) | 45.4 | 8.5 | 555 | 380 |

The cross-linkers produced according to the process of the invention were tested under identical conditions to those for the Comparative Examples. Table 2 shows the results. In this Table, "ml" refers to the milliliters of cross-linker solution injected in the test. The amount of each component added is given in grams (g). The values in parentheses which follow the amounts refer to molar ratio of the component compared to zirconium. Note that the mole ratio for zirconium is 1. All other abbreviations and headings are those provided above under discussion for Table 1.

Table 2 shows that the cross-linkers of this invention cross-link in the desirable 3-10 minute range for use in the 250-400° F. (121-204° C.) range whereas Comparative Examples A and B cross-link at rates that are undesirably slow, 24 and 14 minutes, respectively. The cross-linkers of the invention also maintain significantly higher viscosities (266-470 Cp) than the Comparative Examples (150-228 Cp) to allow successful completion of the fracturing operation. At a desirable cross-linking rate of 3-10 minutes, the Examples prepared according to the process of the invention provide viscosity of at least 200 Cp, and in preferred Examples of at least 300 Cp after 90 minutes.

By varying the ratio of components, such as triethanolamine and tetra-hydroxyisopropylethylenediamine, the rate of cross-linking can be varied to give a faster or slower rate of cross-linking, without dramatically decreasing viscosity development or retention. Based on these observations, the cross-linker solutions prepared according to the process of this invention and the cross-linking compositions of this invention cross-link in the desired 3-10 minute range and retain sufficient viscosity under high temperature conditions temperature test conditions desired by the oil field service companies.

In addition, each of the Examples of the invention resulted in a solution that was stable for at least 6 months.

What is claimed is:

1. A process for preparing a solution of a borozirconate complex suitable for cross-linking in a fracturing fluid comprises: (a) contacting a zirconium complex with an alkanolamine at a ratio of 2 to 10 moles of the alkanolamine per mole of zirconium to form a first mixture; (b) contacting the first mixture with water at a ratio of about 2 to 10 moles of water per mole of zirconium and with 0 to 2 moles of a hydroxyalkylene diamine per mole of zirconium to form a second mixture; (c) contacting the second mixture with 1 to 4 moles of a boron compound per mole of zirconium in an alcohol at a temperature of 25° C. to 90° C. for a period of time sufficient to stabilize the resulting borozirconate solution.

2. The process of claim 1 wherein 0.1 to 2 moles of a hydroxyalkylene diamine is added in step (b) per mole of zirconium to form a second mixture.

3. The process of claim 2 wherein the zirconium complex is a tetraalkyl zirconate selected from the group consisting of tetra-isopropyl zirconate, tetra-n-propyl zirconate, and tetra-n-butyl zirconate.

4. The process of claim 3 wherein the alkanolamine is selected from the group consisting of triethanolamine, tripropanolamine, tri-isopropanolamine, diisopropanolamine, and mixtures of two or more thereof.

5. The process of claim 4 wherein the boron compound is selected from the group consisting of boric acid, alkali metal borates, alkaline earth metal borates, and polymeric borate compounds.

6. The process of claim 5 wherein the boron compound is boric acid.

7. The process of claim 2 wherein 0.5 to 1 mole of a hydroxyalkylene diamine is added in step (b) per mole of zirconium to form a second mixture.

8. The process of claim 2 wherein the hydroxyalkylene diamine is N,N,N',N'-tetrakis-(2-hydroxyisopropyl)ethylene diamine.

9. A cross-linking composition which comprises an aqueous liquid; a pH buffer; a cross-linkable organic polymer; and a borozirconate solution prepared by a process which (a) contacting a zirconium complex with an alkanolamine at a ratio of 2 to 10 moles of the alkanolamine per mole of zirconium to form a first mixture; (b) contacting the first mixture with water at a ratio of about 2 to 10 moles of water per mole of zirconium and with 0 to 2 moles of a hydroxyalkylene diamine per mole of zirconium to form a second mixture; (c) contacting the second mixture with 1 to 4 moles of a boron compound per mole of zirconium in an alcohol at a temperature of 25° C. to 90° C. for a period of time sufficient to stabilize the resulting borozirconate solution.

10. The composition of claim 9 wherein 0.1 to 2 moles of a hydroxyalkylene diamine is added in step (b) per mole of zirconium to form a second mixture.

11. The composition of claim 10 wherein the aqueous liquid is selected from the group consisting of water, aqueous alcohol, and aqueous solution of a clay stabilizer.

12. The composition of claim 11 wherein the aqueous liquid is water, aqueous methanol, aqueous ethanol, an aqueous solution of potassium chloride, an aqueous solution of tetramethylammonium chloride, or a combination of two or more thereof.

13. The composition of claim 11 wherein the organic polymer is a solvatable polysaccharide and is selected from the group consisting of gums, gum derivatives and cellulose derivatives.

14. The composition of claim 11 wherein the organic polymer is hydroxyethyl_guar, hydroxypropyl_guar, carboxyethylhydroxyethyl_guar, carboxymethylhydroxypropyl_guar, carboxymethyl guar, carboxymethylcellulose or carboxymethylhydroxyethylcellulose.

15. The composition of claim 10 wherein 0.5 to 1 mole of a hydroxyalkylene diamine is added in step (b) per mole of zirconium to form a second mixture.

16. The composition of claim 10 wherein the hydroxyalkylene diamine is N,N,N',N'-tetrakis-(2-hydroxyisopropyl)ethylene diamine.

17. A method for hydraulically fracturing a subterranean formation, which comprises introducing into the formation at a flow rate and pressure sufficient to create, reopen, and/or extend one or more fractures in the formation, a cross-linking composition comprising an aqueous liquid; a pH buffer; a cross-linkable organic polymer, and a solution of a borozirconate complex wherein the solution is prepared by a process comprising (a) contacting a zirconium complex with an alkanolamine at a ratio of 2 to 10 moles of the alkanolamine per mole of zirconium to form a first mixture; (b) contacting the first mixture with water at a ratio of about 2 to 10 moles of water per mole of zirconium and with 0 to 2 moles of a hydroxyalkylene diamine per mole of zirconium to form a second mixture; (c) contacting the second mixture with 1 to 4 moles of a boron compound per mole of zirconium in an alcohol at a temperature of 25° C. to 90° C. for a period of time sufficient to stabilize the resulting borozirconate solution.

18. The method of claim 17 wherein the temperature in the formation is 275-325° F. (135-163° C.) and wherein in the process to prepare the solution of borozirconate complex, 0.1 to 2 moles of a hydroxyalkylene diamine per mole of zirconium is added in step (b) to form a second mixture.

19. The method of claim 18 wherein the solution of borozirconate complex and the cross-linkable polymer are contacted prior to their introduction into the formation.

20. The method of claim 18 wherein the subterranean formation is penetrated by a wellbore;
   a base gel is prepared by mixing the cross-linkable organic polymer with the aqueous liquid;
   the solution of borozirconate complex, the base gel, or both further comprise a pH buffer;
   the solution of borozirconate complex is contacted with the base gel in the wellbore to produce a cross-linked gel, and
   the cross-linked gel is introduced into the formation from the wellbore.

21. The method of claim 18 further comprising introducing a cross-linking composition comprising the solution of borozirconate complex, a cross-linkable organic polymer and proppant into the fracture or fractures.

22. A method for selectively plugging permeable zones and leaks in subterranean formations which comprises introducing into the permeable zone or the site of the subterranean leak, a cross-linking composition comprising an aqueous liquid; a pH buffer, a cross-linkable organic polymer; and an aqueous solution of the borozirconate complex comprising an aqueous liquid; a pH buffer; a cross-linkable organic polymer, and a solution of a borozirconate complex wherein the solution is prepared by a process comprising (a) contacting a zirconium complex with an alkanolamine at a ratio of 2 to 10 moles of the alkanolamine per mole of zirconium to form a first mixture; (b) contacting the first mixture with water at a ratio of about 2 to 10 moles of water per mole of zirconium and with 0.1 to 2 moles of a hydroxyalkylene diamine per mole of zirconium to form a second mixture; (c) contacting the second mixture with 1 to 4 moles of a boron compound per mole of zirconium in an alcohol at a temperature of 25° C. to 90° C. for a period of time sufficient to stabilize the resulting borozirconate solution.

23. The method of claim 22 wherein the temperature in the formation is 275-325° F. (135-163° C.) and wherein in the process to prepare the solution of borozirconate complex, 0.1 to 2 moles of a hydroxyalkylene diamine per mole of zirconium is added in step (b) to form a second mixture.

* * * * *